United States Patent
Sakamoto

(10) Patent No.: US 11,996,223 B2
(45) Date of Patent: May 28, 2024

(54) MAGNETORHEOLOGICAL FLUID AND DEVICE

(71) Applicant: NIPPON PAINT HOLDINGS CO., LTD., Osaka (JP)

(72) Inventor: Hiroyuki Sakamoto, Osaka (JP)

(73) Assignee: NIPPON PAINT HOLDINGS CO., LTD., Osaka (JP)

( * ) Notice: Subject to any disclaimer, the term of this patent is extended or adjusted under 35 U.S.C. 154(b) by 559 days.

(21) Appl. No.: 17/296,320

(22) PCT Filed: Nov. 18, 2019

(86) PCT No.: PCT/JP2019/045142
§ 371 (c)(1),
(2) Date: May 24, 2021

(87) PCT Pub. No.: WO2020/110812
PCT Pub. Date: Jun. 4, 2020

(65) Prior Publication Data
US 2021/0398721 A1  Dec. 23, 2021

(30) Foreign Application Priority Data
Nov. 26, 2018 (JP) .................. 2018-220458

(51) Int. Cl.
*H01F 1/44* (2006.01)
*F16F 9/53* (2006.01)

(52) U.S. Cl.
CPC ............... *H01F 1/442* (2013.01); *F16F 9/53* (2013.01); *F16F 9/535* (2013.01); *H01F 1/445* (2013.01); *H01F 1/447* (2013.01)

(58) Field of Classification Search
CPC .......... H01F 1/442; H01F 1/445; H01F 1/447; F16F 9/53; F16F 9/535
See application file for complete search history.

(56) References Cited

U.S. PATENT DOCUMENTS 5,322,756 A    6/1994 Ziolo
5,645,752 A *  7/1997 Weiss ............... H01F 1/447
                                                252/503

FOREIGN PATENT DOCUMENTS

| CN | 101542647 A | 9/2009 |
| CN | 10169158 | * 4/2010 |
| CN | 101691518 A | 4/2010 |
| CN | 101691518 B | 10/2012 |
| JP | S6285990 A | 4/1987 |
| JP | H0625567 A | 2/1994 |
| JP | 3048962 U | 5/1998 |
| JP | 2005206624 A | 8/2005 |
| JP | 2007326183 A | 12/2007 |
| JP | 2009114392 A | 5/2009 |
| JP | 2009235351 A | 10/2009 |
| JP | 2009282131 A | 12/2009 |
| JP | 2010024289 A | 2/2010 |
| JP | 2015069995 A | 4/2015 |
| WO | 2015152187 A1 | 10/2015 |

OTHER PUBLICATIONS

Aug. 17, 2022, the Extended European Search Report issued by the European Patent Office in the corresponding European Patent Application No. 19889570.8.
Mar. 10, 2022, Office Action issued by the Intellectual Property India in the corresponding Indian Patent Application No. 202117023246.
May 16, 2022, Office Action issued by the China National Intellectual Property Administration in the corresponding Chinese Patent Application No. 201980077255.9.
May 25, 2021, International Preliminary Report on Patentability issued in the International Patent Application No. PCT/JP2019/045142.
Jan. 28, 2020, International Search Report issued in the International Patent Application No. PCT/JP2019/045142.
Jan. 1, 2024, Office Action issued by the Intellectual Property India in the corresponding Indian Patent Application No. 202117023246.

* cited by examiner

*Primary Examiner* — C Melissa Koslow
(74) *Attorney, Agent, or Firm* — KENJA IP LAW PC

(57) ABSTRACT

Provided is a magnetorheological fluid having excellent long-term dispersion stability of magnetic particles and a large maximum change of yield stress under magnetic field application conditions. Also provided is a device having excellent long-term stable drivability and mechanism reliability. The magnetorheological fluid contains magnetic particles, resin particles, and a dispersion medium, wherein the proportion constituted by the mass of the magnetic particles relative to the total mass of the magnetorheological fluid is 35 mass % to 95 mass %, the proportion constituted by the mass of the resin particles relative to the total mass of the magnetorheological fluid is 0.3 mass % to 20 mass %, and the average particle diameter of the resin particles is 20 nm to 1,500 nm. This magnetorheological fluid is used in the device.

4 Claims, No Drawings

MAGNETORHEOLOGICAL FLUID AND DEVICE

CROSS-REFERENCE TO RELATED APPLICATION

This application claims the benefit of priority of Japanese Patent Application No. 2018-220458, filed on Nov. 26, 2018, the contents of which are incorporated into this application by reference.

TECHNICAL FIELD

The present disclosure relates to a magnetorheological fluid and a device.

BACKGROUND

A magnetorheological fluid (hereinafter, also referred to as an "MR fluid") is a fluid in which magnetic particles, such as iron, are dispersed in a base oil, such as silicone oil, that serves as a dispersion medium. A property of the MR fluid is that the magnetic particles are randomly suspended in the dispersion medium in a state in which a magnetic field is not applied to the MR fluid from externally thereto, whereas the magnetic particles form numerous clusters in which the magnetic particles are linked as chains along the direction of a magnetic field in a state in which a magnetic field is applied to the MR fluid from externally thereto. This makes it possible to control the formation and breakup of clusters in the MR fluid through application and non-application of a magnetic field. When clusters form, the apparent viscosity of the MR fluid changes, and the yield stress of the MR fluid increases. MR fluids enable transmission and attenuation of force and torque through magnetic field application. For this reason, MR fluids are being investigated for applications in dampers and the like (for example, refer to Patent Literature (PTL) 1).

Since large magnetic particles having a particle diameter of a few micrometers to tens of micrometers are typically used in an MR fluid in order cause a certain level of stress to arise, MR fluids suffer from a problem that these magnetic particles may settle and separate from the dispersion medium when the MR fluid is left. When operation of a device in which an MR fluid is used is attempted in a state in which magnetic particles have settled and hardened, operation of the device may not be possible, or a mechanism of the device may be become damaged.

Typically adopted techniques for improving the dispersion stability of magnetic particles include performing silane coupling treatment of the surfaces of the magnetic particles and adding a dispersion aid such as castor oil or the clay mineral montmorillonite to the MR fluid (for example, refer to PTL 2). However, these techniques are problematic because of the work and cost necessary for silane coupling treatment and the inability to achieve sufficient dispersion stability of magnetic particles even when a dispersion aid is added.

CITATION LIST

Patent Literature

PTL 1: JP 2015-069995 A
PTL 2: JP 2005-206624 A

SUMMARY

Technical Problem

As set forth above, it is desirable for an MR fluid to have long-term dispersion stability of magnetic particles and a large maximum change of yield stress under magnetic field application conditions.

Accordingly, one object of the present disclosure is to provide a magnetorheological fluid having excellent long-term dispersion stability of magnetic particles and a large maximum change of yield stress under magnetic field application conditions.

Another object of the present disclosure is to provide a device having excellent long-term stable drivability and mechanism reliability.

Solution to Problem

A magnetorheological fluid according to the present disclosure comprises:
  magnetic particles;
  resin particles; and
  a dispersion medium, wherein a proportion constituted by mass of the magnetic particles relative to total mass of the magnetorheological fluid is 35 mass % to 95 mass %,
  a proportion constituted by mass of the resin particles relative to total mass of the magnetorheological fluid is 0.3 mass % to 20 mass %, and
  the resin particles have an average particle diameter of 20 nm to 1,500 nm.

In this manner, it is possible to provide a magnetorheological fluid having excellent long-term dispersion stability of magnetic particles and a large maximum change of yield stress under magnetic field application conditions.

In one embodiment of the magnetorheological fluid according to the present disclosure, the resin particles are crosslinked resin particles.

In one embodiment of the magnetorheological fluid according to the present disclosure, the resin particles are at least one selected from the group consisting of an acrylic resin, an ethylene-(meth)acrylic acid copolymer, a polyurethane resin, a melamine resin, and a modified product of any thereof.

In one embodiment of the magnetorheological fluid according to the present disclosure, the dispersion medium includes a compound including at least two types of groups that interact with the magnetic particles in one molecule,
  a proportion constituted by mass of the compound relative to total mass of the dispersion medium is 50 mass % or more, and
  a proportion constituted by mass of the dispersion medium relative to total mass of the magnetic particles, the resin particles, and the dispersion medium is 5 mass % to 45 mass %.

A device according to the present disclosure is a device selected from the group consisting of a robot, a brake, a clutch, a damper, a shock absorber, a seismic motion control device, a haptic device, a tactile sensation presentation device, a medical device, an assistive device, and a suction attachment device in which any one of the magnetorheological fluids set forth above is used. In this manner, it is possible to provide a device having excellent long-term stable drivability and mechanism reliability.

Advantageous Effect

According to the present disclosure, it is possible to provide a magnetorheological fluid having excellent long-term dispersion stability of magnetic particles and a large maximum change of yield stress under magnetic field application conditions. Moreover, according to the present disclosure, it is possible to provide a device having excellent long-term stable drivability and mechanism reliability.

DETAILED DESCRIPTION

The following describes embodiments of the present disclosure. The following description is intended for illustrative purposes only, and is not intended to limit the scope of the present disclosure in any way.

Note that two or more of the embodiments can be freely combined.

The term "average particle diameter" as used in the present disclosure refers to a median value of a particle diameter distribution. The average particle diameter is measured using a laser diffraction particle size distribution analyzer, a scanning electron microscope (SEM), or the like.

(Magnetorheological Fluid)

The magnetorheological fluid according to the present disclosure contains:
magnetic particles;
resin particles; and
a dispersion medium, wherein
a proportion constituted by mass of the magnetic particles relative to total mass of the magnetorheological fluid is 35 mass % to 95 mass %,
a proportion constituted by mass of the resin particles relative to total mass of the magnetorheological fluid is 0.3 mass % to 20 mass %, and
the resin particles have an average particle diameter of 20 nm to 1,500 nm.

The following provides an illustrative description of the magnetic particles, resin particles, and dispersion medium contained in the magnetorheological fluid according to the present disclosure.

<Magnetic Particles>

Any commonly known magnetic particles can be used as the magnetic particles so long as they are magnetic particles for which the yield stress changes under magnetic field application conditions. One type of magnetic particles may be used individually, or two or more types of magnetic particles that differ in terms of material and/or average particle diameter may be used in combination.

Examples of possible materials of the magnetic particles include iron, iron nitride, iron carbide, carbonyl iron, chromium dioxide, low-carbon steel, nickel, and cobalt; iron alloys such as aluminum-containing iron alloys, silicon-containing iron alloys, cobalt-containing iron alloys, nickel-containing iron alloys, vanadium-containing iron alloys, molybdenum-containing iron alloys, chromium-containing iron alloys, tungsten-containing iron alloys, manganese-containing iron alloys, and copper-containing iron alloys, and oxides of these materials; and paramagnetic, superparamagnetic, and ferromagnetic compound particles formed of gadolinium and gadolinium organic derivatives.

The magnetic particles are preferably carbonyl iron.

The average particle diameter of the magnetic particles may be 1 μm to 50 μm, for example, and is preferably 3 μm to 20 μm, and more preferably 4 μm to 10 μm from a viewpoint of yield stress and inhibiting settling.

In addition to the above-described magnetic particles (large magnetic particles), small magnetic particles having a smaller average particle diameter may also be used as the magnetic particles, or may not be used.

Examples of possible materials of the small magnetic particles include iron, ferrites (ferric(III) salts of Mn(II), Co(II), Ni(II), Cu(II), Zn(II), etc.), and magnetite (ferric(III) salt of Fe(II)). The ferrite may be Mn ferrite, Mn—Zn ferrite, Mn—Mg ferrite, Mn—Mg—Sr ferrite, or Mg ferrite; or any of the preceding ferrites containing an alkali metal, alkaline earth metal, or light metal, for example. Other examples include the previously described materials.

The small magnetic particles are preferably at least one selected from the group consisting of magnetite and a ferrite.

In one embodiment, the small magnetic particles are Mn—Mg—Sr ferrite.

The average particle diameter of the small magnetic particles may be 20 nm to 300 nm, for example. The average particle diameter of the small magnetic particles is preferably 40 nm to 200 nm from a viewpoint of yield stress and inhibiting settling.

In a case in which the magnetic particles include small magnetic particles, the proportion constituted by the small magnetic particles relative to the total mass of the magnetic particles may be 5 mass % to 40 mass %, for example.

In the magnetorheological fluid according to the present disclosure, the magnetic particles may or may not be surface treated using a silane coupling agent or the like in order to increase dispersibility. By using the subsequently described resin particles, excellent long-term dispersion stability of the magnetic particles is obtained in the magnetorheological fluid according to the present disclosure even in a case in which the magnetic particles are not surface treated.

In one embodiment, the magnetic particles are not surface treated using a silane coupling agent or the like in order to increase dispersibility.

The proportion constituted by the mass of the magnetic particles relative to the total mass of the magnetorheological fluid is 35 mass % to 95 mass %. Sufficient yield stress and sufficient dispersion stability are not obtained when the proportion constituted by the magnetic particles is less than 35 mass %, whereas dispersion is poor when the proportion constituted by the magnetic particles is more than 95 mass %. In one embodiment, this proportion is 40 mass % or more, 50 mass % or more, 60 mass % or more, 70 mass % or more, 80 mass % or more, or 90 mass % or more. Moreover, in one embodiment, this proportion is 90 mass % or less, 80 mass % or less, 70 mass % or less, 60 mass % or less, 50 mass % or less, or 40 mass % or less. The proportion constituted by the magnetic particles is preferably 50 mass % to 90 mass %, and more preferably 60 mass % to 90 mass % from a viewpoint of magnetic field response speed and yield stress of the magnetorheological fluid.

<Resin Particles>

The resin particles in the magnetorheological fluid according to the present disclosure are particles made of resin that contribute to dispersion stability of the magnetic particles. One type of resin particles may be used individually, or two or more types of resin particles may be used in combination.

Any commonly known resin particles can be used as the resin particles without any specific limitations so long as they have an average particle diameter of 20 nm to 1,500 nm.

The material of the resin particles may be a commonly known resin that is selected as appropriate without any specific limitations. Examples of possible materials of the resin particles include acrylic resins, styrene resins, polyolefin resins, polyester resins, melamine resins, benzoguanamine resins, polyacrylonitrile resins, polyamide resins, polycarbonate resins, phenolic resins, urea resins, fluororesins, cellulosic resins, polyurethane resins, vinyl chloride resins, polyether resins, silicone resins, and alkyd resins.

The acrylic resin may be a homopolymer or copolymer of a monomer such as acrylic acid, methacrylic acid, an acrylic acid ester, or a methacrylic acid ester, may be a copolymer of one or more of these monomers with a monomer such as ethylene or styrene (for example, an ethylene-acrylic acid copolymer, a styrene-acrylic acid copolymer, etc.), or may be a modified product of any of these polymers or copolymers (for example, a fluorinated acrylic resin).

The resin particles may be core-shell particles in which the core and the shell are each formed from one of the aforementioned materials or from two or more of the aforementioned materials.

The resin particles may, for example, be non-crosslinked resin particles in which polymer in the resin is not crosslinked, or may be crosslinked resin particles in which polymer in the resin is crosslinked. Crosslinked resin particles are preferable because they have better heat resistance and solvent resistance than non-crosslinked resin particles, and thus have a lower tendency to melt through heat caused by sliding movement or the like of a device in which the magnetorheological fluid is used or through the dispersion medium itself, and make it possible to obtain more stable magnetic field-generated stress.

Any commonly known crosslinked resin particles can be used as the crosslinked resin particles without any specific limitations. For example, the crosslinked resin particles may be organic resin particles (A) described in WO 2015/152187 A1; crosslinked resin particles described in JP 2010-024289 A; crosslinked resin particles described in JP 2009-235351 A such as resin particles formed of a resin having a crosslinked structure obtained through mainly an ethylenically unsaturated monomer, resin particles formed of an internally crosslinked urethane resin, or crosslinked resin particles formed of an internally crosslinked melamine resin; crosslinked resin particles that are a carboxyl group-containing acrylic resin described in JP 2009-114392 A; acrylic resin fine particles having an internally crosslinked structure described in JP H6-025567 A; or the like.

The crosslinked resin particles can be obtained by, for example, adding a silane coupling agent such as 2-(3,4-epoxycyclohexyl)ethyltrimethoxysilane and a polyfunctional epoxy group-containing compound such as hydrogenated bisphenol A diglycidyl ether to a water dispersion of a resin such as an acrylic resin, a styrene resin, a polyolefin resin, a polyester resin, a melamine resin, a benzoguanamine resin, a polyacrylonitrile resin, a polyamide resin, a polycarbonate resin, a phenolic resin, a urea resin, a fluororesin, a cellulosic resin, a polyurethane resin, a vinyl chloride resin, a polyether resin, a silicone resin, an alkyd resin, or a copolymer, and then carrying out a reaction at 85° C. for 2 hours as described in WO 2015/152187 A1.

In one embodiment of the magnetorheological fluid according to the present disclosure, the resin particles are crosslinked resin particles.

In one embodiment of the magnetorheological fluid according to the present disclosure, the resin particles are at least one selected from the group consisting of an acrylic resin, a polyurethane resin, a melamine resin, and a modified product of any thereof. In another embodiment, the resin particles are crosslinked resin particles of at least one selected from the group consisting of an acrylic resin, a polyurethane resin, a melamine resin, and a modified product of any thereof.

In one embodiment, the acrylic resin is at least one selected from the group consisting of an acrylic acid ester polymer, a methacrylic acid ester polymer, a styrene-acrylic acid copolymer, a styrene-methacrylic acid copolymer, an ethylene-acrylic acid copolymer, an ethylene-methacrylic acid copolymer, and a modified product of any thereof.

The weight-average molecular weight (Mw) of the resin particles can be adjusted as appropriate without any specific limitations. In one embodiment, Mw of the resin particles is 1,000 or more, 5,000 or more, 6,000 or more, 10,000 or more, 50,000 or more, 100,000 or more, 500,000 or more, or 1,000,000 or more. Moreover, in one embodiment, Mw of the resin particles is 10,000,000 or less, 5,000,000 or less, 3,000,000 or less, 1,000,000 or less, 500,000 or less, 300,000 or less, 100,000 or less, or 50,000 or less.

The average particle diameter of the resin particles is 20 nm to 1,500 nm. In one embodiment, the average particle diameter of the resin particles is 50 nm or more, 80 nm or more, 100 nm or more, 150 nm or more, 200 nm or more, 300 nm or more, 400 nm or more, 500 nm or more, 600 nm or more, 700 nm or more, 800 nm or more, 900 nm or more, 1,000 nm or more, 1,100 nm or more, 1,200 nm or more, 1,300 nm or more, or 1,400 nm or more. Moreover, in one embodiment, the average particle diameter of the resin particles is 1,400 nm or less, 1,300 nm or less, 1,200 nm or less, 1,100 nm or less, 1,000 nm or less, 900 nm or less, 800 nm or less, 700 nm or less, 600 nm or less, 500 nm or less, 400 nm or less, 300 nm or less, 200 nm or less, or 150 nm or less.

So long as the average particle diameter of the resin particles is within a range of 20 nm to 1,500 nm, two or more types of resin particles having different average particle diameters may be used in combination. For example, first resin particles having an average particle diameter of 20 nm to 200 nm and second resin particles having an average particle diameter of more than 200 nm and not more than 1,500 nm may be used in combination.

So long as the average particle diameter of the resin particles is 20 nm to 1,500 nm, resin particles having an average particle diameter of 20 nm to 1,500 nm may be obtained in resin particle production, such as with organic resin particles (A) described in WO 2015/152187 A1, and then these resin particles may be compounded in the magnetorheological fluid, or a raw material resin may be pulverized to obtain resin particles having an average particle diameter of 20 nm to 1,500 nm, and then these resin particles may be compounded in the magnetorheological fluid.

The proportion constituted by the mass of the resin particles relative to the total mass of the magnetorheological fluid is 0.3 mass % to 20 mass %. Sufficient dispersion stability is not obtained when the proportion constituted by the resin particles is less than 0.3 mass %, whereas sufficient yield stress is not obtained when the proportion constituted by the resin particles is more than 20 mass %. In one embodiment, this proportion is 0.5 mass % or more, 1 mass % or more, 2 mass % or more, 3 mass % or more, 4 mass % or more, 5 mass % or more, 6 mass % or more, 7 mass % or more, 8 mass % or more, 9 mass % or more, 10 mass % or more, or 15 mass % or more. Moreover, in one embodiment, this proportion is 19 mass % or less, 15 mass % or less, 10 mass % or less, 9 mass % or less, 8 mass % or less, 7 mass % or less, 6 mass % or less, 5 mass % or less, 4 mass % or less, 3 mass % or less, 2 mass % or less, or 1 mass % or less.

The mass ratio of the magnetic particles relative to the resin particles may be 1.75 to 320, for example, and is preferably 5 to 200 because this provides even better long-term dispersion stability.

<Dispersion Medium>

Any commonly known dispersion medium for an MR fluid can be used as the dispersion medium without any specific limitations. For example, the dispersion medium may be a silicone oil, fluorine oil, polyalphaolefin, paraffin, ether oil, ester oil, mineral oil, plant oil, animal oil, or the like. One type of dispersion medium may be used individually, or two or more types of dispersion mediums may be used in combination.

The dispersion medium of the magnetorheological fluid according to the present disclosure may include a compound including at least two types of groups that interact with the magnetic particles in one molecule (hereinafter, also referred to simply as a "dispersion medium compound").

Examples of the groups of the dispersion medium compound that interact with the magnetic particles include a hydroxy group, a carboxy group, an ether group, a nitrile group, an amino group, an amide group, an imide group, a sulfo group, a thiol group, a sulfide group, a phosphate group, and a metal salt or metal complex of any of these groups; a group including a heteroatom such as N, S, P, or Se; and a polyoxyalkylene group. In one embodiment, the groups that interact with the magnetic particles are preferably groups having high polarizability.

The dispersion medium compound may be non-ionic, cationic, or anionic. In one embodiment, the dispersion medium compound is non-ionic.

The groups of the dispersion medium compound that interact with the magnetic particles are preferably selected from the group consisting of an amide group, a polyoxyalkylene group, and a phosphate group.

The amide group may be a group represented by —$CONH_2$ or —CONR—, for example. Note that R is hydrogen or a monovalent organic group. In one embodiment, the monovalent organic group is an alkyl group having a carbon number of 1 to 6, in another embodiment, the monovalent organic group is a methyl group or an ethyl group, and in yet another embodiment, the monovalent organic group is a methyl group.

The polyoxyalkylene group may be a group represented by -$(AO)_x$—, for example, where A is a linear, branched, or cyclic divalent hydrocarbon group, and x is a real number of 1 to 30. Examples of the polyoxyalkylene group include polyalkylene oxide groups in which the carbon number of the alkylene group in a repeating unit is 2 to 5, such as a polyethylene oxide group, a polypropylene oxide group, and a polybutylene oxide group, and combinations of such polyalkylene oxide groups.

The phosphate group may be a group represented by —$OP(O)(OH)_2$ or —OP(O)(OY)(OH), for example, where Y is an alcohol residue.

The dispersion medium compound may, for example, be a polyoxyalkylene adduct of a carboxylic acid amide or the like.

The carboxylic acid forming the carboxylic acid amide may be a carboxylic acid including one carboxy group or including two or more carboxy groups, such as a monocarboxylic acid, a dicarboxylic acid, or a tricarboxylic acid, for example. In a case in which the carboxylic acid forming the carboxylic acid amide includes a plurality of carboxy groups, at least one carboxy group among the plurality of carboxy groups is amidated to form the carboxylic acid amide, and the remaining carboxy group(s) may each remain as a carboxy group or the like other than an amide group. Moreover, in a case in which the carboxylic acid forming the carboxylic acid amide includes a plurality of carboxy groups, all of the carboxy groups may be amidated to form the carboxylic acid amide. The structure of a part other than the carboxy group(s) in the carboxylic acid forming the carboxylic acid amide may, for example, be a linear, branched, or cyclic hydrocarbon having a carbon number of 1 to 30 that is saturated or unsaturated, or the like.

The polyoxyalkylene adduct of the carboxylic acid amide includes at least one structure where a polyoxyalkylene group is added to an amide group. In a case in which the carboxylic acid amide includes a plurality of amide groups, a structure where a polyoxyalkylene group is added to at least one amide group among the plurality of amide groups is included, and the remaining amide group(s) may each be present as an amide group to which a polyoxyalkylene group is not added. Moreover, in a case in which the carboxylic acid amide includes a plurality of amide groups, polyoxyalkylene groups may be added to all of the amide groups.

In one embodiment, the dispersion medium compound is a polyoxyalkylene adduct of a carboxylic acid amide.

The polyoxyalkylene adduct of the carboxylic acid amide may, for example, be a polyoxyalkylene adduct of a fatty acid amide or the like.

The fatty acid part of the polyoxyalkylene adduct of the fatty acid amide may be derived from an unsaturated fatty acid (i.e., may be an unsaturated hydrocarbon) or may be derived from a saturated fatty acid (i.e., may be a saturated hydrocarbon).

In a case in which the fatty acid part of the polyoxyalkylene adduct of the fatty acid amide is derived from an unsaturated fatty acid, the fatty acid part may include one unsaturated carbon bond, such as a double bond or a triple bond, or may include two or more unsaturated carbon bonds.

In a case in which the fatty acid part of the polyoxyalkylene adduct of the fatty acid amide is derived from an unsaturated fatty acid including a double bond, the structure of the fatty acid part may be a cis structure or may be a trans structure.

A hydrocarbon part of the fatty acid of the polyoxyalkylene adduct of the fatty acid amide may be linear, branched, or cyclic.

A polyoxyalkylene part of the polyoxyalkylene adduct of the fatty acid amide may, for example, be a polyalkylene oxide having a carbon number of 2 to 5, such as polyethylene oxide, polypropylene oxide, or polybutylene oxide, or a combination of these polyalkylene oxides.

The polyoxyalkylene adduct of the fatty acid amide may be a compound having a general formula of $RCONH(C_nH_{2n}O)_xH$ or the like, for example. In the formula, R is a linear, branched, or cyclic hydrocarbon having a carbon number of 8 to 30 that is saturated or unsaturated, n is an integer of 2 to 5, and x is a real number of 1 to 30.

In one embodiment, the polyoxyalkylene adduct of the fatty acid amide is at least one selected from the group consisting of $C_{17}H_{33}CONH(C_2H_4O)xH$ and $C_{17}H_{33}CONH(C_3H_6O)xH$. In these formulae, x is 1, 2, 3, 4, 5, 6, 7, 8, 9, 10, 11, 12, 13, 14, 15, 16, 17, 18, 19, or 20. In another embodiment, the polyoxyalkylene adduct of the fatty acid amide is at least one selected from the group consisting of $C_{17}H_{33}CONH(C_2H_4O)xH$, where x is 4 to 12.

In one embodiment, the polyoxyalkylene adduct of the fatty acid amide is non-ionic.

In one embodiment, the dispersion medium compound is a polyoxyalkylene adduct of a fatty acid amide.

The proportion constituted by the mass of the dispersion medium compound relative to the total mass of the dispersion medium may be adjusted as appropriate without any specific limitations. In one embodiment, this proportion is 50 mass % or more, 60 mass % or more, 70 mass % or more, 80 mass % or more, 90 mass % or more, 95 mass % or more, or 100 mass %. Moreover, in one embodiment, this proportion is 100 mass % or less, 90 mass % or less, 80 mass % or less, 70 mass % or less, or 60 mass % or less. This proportion is preferably 60 mass % to 100 mass %.

One type of dispersion medium compound may be used individually, or two or more types of dispersion medium compounds may be used in combination.

In one embodiment, the content of a base oil selected from the group consisting of a fatty acid ester, silicone oil, fluorine oil, and paraffin in the magnetorheological fluid according to the present disclosure is 50 mass % or less, 40 mass % or less, 30 mass % or less, 20 mass % or less, 10 mass % or less, or 5 mass % or less relative to the total mass of the dispersion medium. In another embodiment, the magnetorheological fluid according to the present disclosure does not substantially contain a base oil selected from the group consisting of a fatty acid ester, silicone oil, fluorine oil, and paraffin. In yet another embodiment, the magnetorheological fluid according to the present disclosure does not contain a base oil selected from the group consisting of a fatty acid ester, silicone oil, fluorine oil, and paraffin. The phrase "does not substantially contain" a base oil such as a silicone oil as used in this paragraph means that the base oil mentioned in this paragraph is not intentionally added to the magnetorheological fluid or is not contained in excess of an amount that is unavoidable.

The proportion constituted by the dispersion medium may be adjusted as appropriate and may be 5 mass % to 45 mass %, for example, relative to the total mass of the magnetic particles, the resin particles, and the dispersion medium. This proportion is preferably 10 mass % to 40 mass %, and more preferably 10 mass % to 30 mass %.

In one embodiment of the magnetorheological fluid according to the present disclosure, the dispersion medium includes a compound including at least two types of groups that interact with the magnetic particles in one molecule,
  a proportion constituted by mass of the compound relative to total mass of the dispersion medium is 50 mass % or more, and
  a proportion constituted by mass of the dispersion medium relative to total mass of the magnetic particles, the resin particles, and the dispersion medium is 5 mass % to 45 mass %.

One type of dispersion medium may be used individually, or two or more types of dispersion mediums may be used in combination.

<Other Additives>

The magnetorheological fluid according to the present disclosure may or may not contain other additives besides the ingredients described above, such as dispersion aids, rheological control agents, metal detergent/dispersant additives, ash-free detergent/dispersant additives, oiliness agents, anti-wear agents, extreme pressure additives, rust inhibitors, friction modifiers, solid lubricants, antioxidants, metal deactivators, defoamers, colorants, viscosity index improvers, and pour point depressants. Each of these other additives may be one type used individually or may be two or more types used in combination.

Dispersion Aid

Typically used non-aqueous and aqueous wetting and dispersing agents can be used as dispersion aids. A functional group of a dispersion aid that contributes to magnetic substance adsorption may be an acidic functional group, a basic functional group, or a salt functional group, and is preferably a basic functional group or a salt functional group due to there being little interaction with magnetic particles of some materials. The molecular weight of the dispersion aid may be selected as appropriate as any molecular weight ranging from low molecular weight to high molecular weight depending on the combination with the dispersion medium.

In a case in which a dispersion aid is used, the amount thereof may be adjusted as appropriate. For example, the proportion constituted by the dispersion aid relative to the total mass of the magnetic particles, the dispersion medium, and the dispersion aid may be 0.5 mass % to 10 mass %.

In one embodiment, the magnetorheological fluid according to the present disclosure does not contain a dispersion aid. In another embodiment, the magnetorheological fluid according to the present disclosure contains a dispersion aid.

<Production Method of Magnetorheological Fluid>

No specific limitations are placed on the method by which the magnetorheological fluid is produced, and the magnetorheological fluid can be produced by mixing the magnetic particles, the resin particles, the dispersion medium, and other additives, as necessary, in any order. For example, the production method of the magnetorheological fluid may involve preparing the magnetic particles, the resin particles, and the dispersion medium, adding the dispersion medium to the magnetic particles and the resin particles and stirring the dispersion medium therewith, and then optionally adding and stirring other additives such as a dispersion aid.

The magnetorheological fluid according to the present disclosure can be used in any commonly known application for MR fluids without any specific limitations. Examples of applications in which the magnetorheological fluid can be used include robots, brakes, clutches, dampers, shock absorbers, seismic motion control devices, haptic devices, tactile sensation presentation devices, medical devices, assistive devices, and suction attachment devices.

The device according to the present disclosure is a device selected from the group consisting of a robot, a brake, a clutch, a damper, a shock absorber, a seismic motion control device, a haptic device, a tactile sensation presentation device, a medical device, an assistive device, and a suction attachment device in which any one of the magnetorheological fluids set forth above is used. In this manner, it is possible to provide a device having excellent long-term stable drivability and mechanism reliability.

EXAMPLES

The following provides a more detailed description of the present disclosure by way of examples. These examples are intended for illustrative purposes only, and are not intended to limit the scope of the present disclosure in any way. Used amounts referred to the following examples are "parts by mass" unless otherwise specified.

Details of materials used in the examples are indicated below.

Magnetic Particles

Magnetic particles (large magnetic particles): Carbonyl iron powder; CIP-SQ (product name) produced by BASF Corporation; average particle diameter 4.5 μm; denoted as "Large magnetic particles" in Table 3

Small magnetic particles: Mn—Mg—Sr ferrite; E-001 (product name) produced by Powdertech Co., Ltd.; average particle diameter 40 nm Resin Particles Resin particles A: Styrene-acrylic acid copolymer fine particles (crosslinked resin particles); MG-451 (product name) produced by Nippon Paint Industrial Coatings Co., Ltd.; average particle diameter 100 nm Resin particles B: Styrene-acrylic acid copolymer fine particles (crosslinked resin particles); MG-351 (product name) produced by Nippon Paint Industrial Coatings Co., Ltd.; average particle diameter 1,000 nm Comparative particles C: AEROSIL300 (product name) produced by Nippon Aerosil Co., Ltd.; average particle diameter 10 nm Comparative resin particles D: EPOSTAR MA1002 (product name) produced by Nippon Shokubai Co., Ltd.; average particle diameter 2,000 nm (crosslinked acrylic and acrylic-styrenic resin)

Dispersion Medium

Dispersion medium 1: C8/C10-Trimethylolpropane ester; TOENOL #8309 (product name) produced by Toei Chemical Co., Ltd.

Dispersion medium 2: Compound including at least two types of groups that interact with magnetic particles in one molecule (polyoxyalkylene adduct of fatty acid amide); BLAUNON® (BLAUNON is a registered trademark in Japan, other countries, or both) O-15-PO-20 (product name) produced by Aoki Oil Industrial Co., Ltd.; polyoxypropylene oleamide; chemical formula $C_{17}H_{33}CONH(C_3H_6O)_{20}H$ Dispersion medium 3: Liquid paraffin; 80-S(product name) produced by Sanko Chemical Industry Co., Ltd.

The following devices were used in the examples.

Three-roll disperser: 501 (product name) produced by Exakt Technologies

Rheometer: MCR 302 (product name) produced by Anton Paar GmbH; double gap structure MRD cell (magnetic field measuring unit) mounted Examples 1 to 19 and Comparative Examples 1 to 6

Ingredients were prepared in the formulations shown in Tables 1 to 3. Magnetic particles and resin particles were loaded into a vessel in advance and were mixed until homogeneous. Thereafter, a dispersion medium and a dispersion aid were added and were simply stirred therewith until homogeneous. The mixture was subsequently passed through a three-roll disperser five times under narrowest opening conditions in order to cause dispersion and thereby produce a magnetorheological fluid or a comparative MR fluid. Note that "Dispersion medium proportion" in Tables 1 to 3 indicates the proportion constituted by the mass of the dispersion medium relative to the total mass of the magnetic particles, the resin particles, and the dispersion medium.

TABLE 1

| | | Average particle diameter | Example |||||||||
|---|---|---|---|---|---|---|---|---|---|---|---|
| | | | 1 | 2 | 3 | 4 | 5 | 6 | 7 | 8 | 9 |
| Formulation (parts by mass) | Magnetic particles | 4.5 μm | 66.5 | 66.0 | 65.4 | 63.65 | 60.3 | 40.0 | 65.4 | 66.5 | 65.4 |
| | Resin particles A | 100 nm | 0.5 | 1.0 | 1.6 | 3.35 | 6.7 | 20.0 | 1.6 | 0 | 0 |
| | Resin particles B | 1000 nm | 0 | 0 | 0 | 0 | 0 | 0 | 0 | 0.5 | 1.6 |
| | Comparative particles C | 10 nm | 0 | 0 | 0 | 0 | 0 | 0 | 0 | 0 | 0 |
| | Comparative resin particles D | 2000 nm | 0 | 0 | 0 | 0 | 0 | 0 | 0 | 0 | 0 |
| | Dispersion medium 1 | | 24.3 | 24.3 | 24.3 | 24.3 | 24.3 | 30.3 | 30.3 | 24.3 | 24.3 |
| | Dispersion medium 2 | | 0 | 0 | 0 | 0 | 0 | 0 | 0 | 0 | 0 |
| | Dispersion medium 3 | | 2.7 | 2.7 | 2.7 | 2.7 | 2.7 | 3.7 | 2.7 | 2.7 | 2.7 |
| | Dispersion aid | | 6.0 | 6.0 | 6.0 | 6.0 | 6.0 | 6.0 | 0 | 6.0 | 6.0 |
| | Total formulation | | 100.0 | 100.0 | 100.0 | 100.0 | 100.0 | 100.0 | 100.0 | 100.0 | 100.0 |
| | Dispersion medium proportion (mass %) | | 28.7 | 28.7 | 28.7 | 28.7 | 28.7 | 36.2 | 33.0 | 28.7 | 28.7 |
| Evaluation | Dispersion stability 14 days | | B | B | A | A | A | A | B | B | B |
| | Dispersion stability 60 days | | C | B | B | A | A | B | B | B | B |
| | Shear yield stress 1.5 T (Pa) | | 13200 | 13000 | 12500 | 11900 | 10000 | 6800 | 12800 | 13000 | 12300 |

| | | Average particle diameter | Example || Comparative Example |||||
|---|---|---|---|---|---|---|---|---|---|
| | | | 10 | 11 | 1 | 2 | 3 | 4 | 5 |
| Formulation (parts by mass) | Magnetic particles | 4.5 μm | 60.3 | 65.4 | 67.0 | 67.0 | 33.0 | 65.4 | 65.4 |
| | Resin particles A | 100 nm | 0 | 0 | 0 | 0.2 | 25.0 | 0 | 0 |
| | Resin particles B | 1000 nm | 6.7 | 1.6 | 0 | 0 | 0 | 0 | 0 |
| | Comparative particles C | 10 nm | 0 | 0 | 0 | 0 | 0 | 1.6 | 0 |
| | Comparative resin particles D | 2000 nm | 0 | 0 | 0 | 0 | 0 | 0 | 1.6 |
| | Dispersion medium 1 | | 24.3 | 0 | 24.3 | 24.1 | 30.3 | 24.3 | 24.3 |
| | Dispersion medium 2 | | 0 | 27 | 0 | 0 | 0 | 0 | 0 |
| | Dispersion medium 3 | | 2.7 | 0 | 2.7 | 2.7 | 5.7 | 2.7 | 2.7 |
| | Dispersion aid | | 6.0 | 6.0 | 6.0 | 6.0 | 6.0 | 6.0 | 6.0 |
| | Total formulation | | 100.0 | 100.0 | 100.0 | 100.0 | 100.0 | 100.0 | 100.0 |
| | Dispersion medium proportion (mass %) | | 28.7 | 28.7 | 28.7 | 28.5 | 38.3 | 28.7 | 28.7 |
| Evaluation | Dispersion stability 14 days | | A | B | C | C | B | C | C |
| | Dispersion stability 60 days | | B | C | E | D | B | D | E |
| | Shear yield stress 1.5 T (Pa) | | 9900 | 14200 | 13900 | 13900 | 3000 | 12200 | 12600 |

TABLE 2

|  |  |  | Example | | Comparative Example |
|---|---|---|---|---|---|
|  |  | Average particle diameter | 12 | 13 | 6 |
| Formulation (parts by mass) | Magnetic particles | 4.5 μm | 35.0 | 88.0 | 96.0 |
|  | Resin particles A | 100 nm | 20.0 | 0.3 | 0.3 |
|  | Dispersion medium 1 |  | 30.3 | 0 | 3.7 |
|  | Dispersion medium 2 |  | 0 | 11.7 | 0 |
|  | Dispersion medium 3 |  | 5.7 | 0 | 0 |
|  | Dispersion aid |  | 9.0 | 0 | 0 |
|  | Total formulation |  | 100.0 | 100.0 | 100.0 |
|  | Dispersion medium proportion (mass %) |  | 39.6 | 11.7 | 3.7 |
| Evaluation | Dispersion stability 14 days |  | B | A | — |
|  | Dispersion stability 60 days |  | B | A | — |
|  | Shear yield stress 1.5 T (Pa) |  | 5100 | 66000 | — |

TABLE 3

|  |  | Average particle diameter | Example | | | | | |
|---|---|---|---|---|---|---|---|---|
|  |  |  | 14 | 15 | 16 | 17 | 18 | 19 |
| Formulation (parts by mass) | Large magnetic particles | 4.5 μm | 66.5 | 65.4 | 60.3 | 61.5 | 61.5 | 60.4 |
|  | Small magnetic particles | 40 nm | 0 | 0 | 0 | 5.0 | 5.0 | 5.0 |
|  | Resin particles A | 100 nm | 0.5 | 1.6 | 6.7 | 0.5 | 0.5 | 1.6 |
|  | Dispersion medium 1 |  | 0 | 0 | 0 | 24.3 | 0 | 30.3 |
|  | Dispersion medium 2 |  | 27.0 | 27.0 | 27.0 | 0 | 27.0 | 0 |
|  | Dispersion medium 3 |  | 0 | 0 | 0 | 2.7 | 0 | 2.7 |
|  | Dispersion aid |  | 6.0 | 6.0 | 6.0 | 6.0 | 6.0 | 0 |
|  | Total formulation |  | 100.0 | 100.0 | 100.0 | 100.0 | 100.0 | 100.0 |
|  | Dispersion medium proportion (mass %) |  | 28.7 | 28.7 | 28.7 | 28.7 | 28.7 | 33.0 |
| Evaluation | Dispersion stability 14 days |  | B | A | A | A | A | A |
|  | Dispersion stability 60 days |  | B | B | A | B | B | C |
|  | Shear yield stress 1.5 T (Pa) |  | 14900 | 14200 | 11000 | 11100 | 13600 | 10200 |

Each of the produced magnetorheological fluids or comparative MR fluids was used to measure dispersion stability and maximum change of yield stress as described below.

(Dispersion Stability)

A magnetorheological fluid or comparative MR fluid was loaded into a 30 mL sample tube straight after production of the magnetorheological fluid or comparative MR fluid such that the magnetorheological fluid or comparative MR fluid filled up to a shoulder part of the sample tube, and was then left at rest and stored at 25° C. The distance from the shoulder part of the sample tube to an interface at which separation of a dispersion medium and magnetic particles occurred (separation width; units: mm) was measured for the magnetorheological fluid or comparative MR fluid after 14 days of storage and after 60 days of storage, and dispersion stability was evaluated by the following grades. The results are shown in Tables 1 to 3. A smaller separation width indicates better dispersion stability. A grade A or B after 14 days of storage is considered to pass evaluation. Moreover, a grade A or B after 60 days of storage is more preferable.

Grades
A: No separation observed
B: Separation width of less than 3 mm
C: Separation width of not less than 3 mm and less than 8 mm
D: Separation width of not less than 8 mm and less than 15 mm
E: Separation width of 15 mm or more (Maximum Change of Yield Stress)

After loading 0.6 mL of a magnetorheological fluid or a comparative MR fluid into a rheometer, vibrational analysis was performed with a frequency of 10 Hz and a strain of 10% under saturation magnetic field application conditions at a magnetic flux density of 1.5 T (tesla). The shear yield stress (Pa) arising under these magnetic field application conditions was measured. The results are shown in Tables 1 to 3. A shear yield stress of 5,000 Pa or more is considered to pass evaluation.

As can be seen from Tables 1 to 3, it was possible to provide a magnetorheological fluid having excellent long-term dispersion stability of magnetic particles and a large maximum change of yield stress under magnetic field application conditions in the examples. In Comparative Example 6, the comparative MR fluid had high viscosity and dispersion was not possible, and thus measurement of dispersion stability and maximum change of yield stress could not be performed.

INDUSTRIAL APPLICABILITY

According to the present disclosure, it is possible to provide a magnetorheological fluid having excellent long-term dispersion stability of magnetic particles and a large maximum change of yield stress under magnetic field application conditions.

The invention claimed is:

1. A magnetorheological fluid comprising:
   magnetic particles;
   resin particles; and
   a dispersion medium, wherein
   a proportion constituted by mass of the magnetic particles relative to total mass of the magnetorheological fluid is 35 mass % to 95 mass %,
   a proportion constituted by mass of the resin particles relative to total mass of the magnetorheological fluid is 0.3 mass % to 20 mass %,
   the resin particles have an average particle diameter of 20 nm to 1,500 nm,
   the dispersion medium includes a compound including at least two types of groups that interact with the magnetic particles in one molecule,
   a proportion constituted by mass of the compound relative to total mass of the dispersion medium is 50 mass % or more, and
   a proportion constituted by mass of the dispersion medium relative to total mass of the magnetic particles, the resin particles, and the dispersion medium is 5 mass % to 45 mass %.

2. The magnetorheological fluid according to claim 1, wherein the resin particles are crosslinked resin particles.

3. The magnetorheological fluid according to claim 1, wherein the resin particles are at least one selected from the group consisting of an acrylic resin, a polyurethane resin, a melamine resin, and a modified product of any thereof.

4. A device selected from the group consisting of a robot, a brake, a clutch, a damper, a shock absorber, a seismic motion control device, a haptic device, a tactile sensation presentation device, a medical device, an assistive device, and a suction attachment device in which the magnetorheological fluid according to claim 1 is used.

* * * * *